United States Patent [19]

Kwiatkowski et al.

[11] Patent Number: 4,956,606
[45] Date of Patent: Sep. 11, 1990

[54] NON-CONTACT INDUCTIVE DISTANCE MEASURING SYSTEM WITH TEMPERATURE COMPENSATION

[75] Inventors: Richard F. Kwiatkowski, Wexford; Bruce C. Gallagher, Callery; Jack L. Bicehouse, Renfrew, all of Pa.

[73] Assignee: Mine Safety Appliances Company, Pittsburgh, Pa.

[21] Appl. No.: 661,726

[22] Filed: Oct. 17, 1984

[51] Int. Cl.$^5$ ............................................. G01R 33/025
[52] U.S. Cl. ........................... 324/207.12; 324/207.16; 324/207.26; 324/225
[58] Field of Search ............... 324/204, 207, 208, 224, 324/225, 226, 228, 234, 236, 260, 261, 262; 336/179; 331/167, 65, 117 R; 330/110

[56] References Cited

U.S. PATENT DOCUMENTS

| | | | |
|---|---|---|---|
| 2,790,145 | 4/1957 | Bartelink | 324/204 X |
| 3,577,090 | 5/1971 | Montgomery, Jr. | 330/110 X |
| 3,619,805 | 11/1971 | Bean | 324/207 X |
| 3,651,398 | 3/1972 | Urmenyi | 324/224 |
| 3,750,010 | 7/1973 | Abnett et al. | 336/179 X |
| 3,818,369 | 6/1974 | Brocker | 331/65 |
| 3,997,835 | 12/1976 | Ando et al. | 324/207 |
| 4,001,718 | 1/1977 | Wilson et al. | 324/207 X |
| 4,027,233 | 5/1977 | Shmakou et al. | 324/204 X |
| 4,030,027 | 6/1977 | Yamada et al. | 324/207 |
| 4,186,792 | 2/1980 | Yamada et al. | 324/207 X |
| 4,193,041 | 3/1980 | Pagel | 331/65 |
| 4,212,342 | 7/1980 | Linder et al. | 324/204 X |
| 4,257,010 | 3/1981 | Bergman et al. | 331/65 |
| 4,267,508 | 5/1981 | Ando | 324/207 X |
| 4,310,807 | 1/1982 | McKee | 331/65 |
| 4,414,541 | 11/1983 | Ho | 331/65 X |
| 4,475,083 | 10/1984 | Linder | 324/227 |
| 4,578,576 | 3/1986 | Wheeler et al. | 330/110 X |

FOREIGN PATENT DOCUMENTS

| | | |
|---|---|---|
| 0036782 | 5/1980 | Japan ................ 324/224 |
| 1165631 | 10/1969 | United Kingdom . |
| 1485514 | 9/1977 | United Kingdom . |
| 2027210 | 2/1980 | United Kingdom . |
| 2056071 | 3/1981 | United Kingdom . |
| 2096322 | 10/1982 | United Kingdom . |

Primary Examiner—Reinhard J. Eisenzopf
Assistant Examiner—Warren S. Edmonds
Attorney, Agent, or Firm—Clifford A. Poff

[57] ABSTRACT

A non-contact level measurement system for monitoring distances with very high accuracy between a sensor coil and a metallic object such as a molten liquid level over either very narrow or extended distances. Means are provided for compensating for temperature and other non-linear effects including other inductive fields, environmental changes and the like. The system incorporates an L-C resonant circuit connected between the output of an oscillator and the input of an operational amplifier.

7 Claims, 3 Drawing Sheets

NON-CONTACT INDUCTIVE DISTANCE MEASURING SYSTEM WITH TEMPERATURE COMPENSATION

BACKGROUND OF THE INVENTION

The present invention relates to non-contact systems for detecting the level of a liquid metal bath; although it may be used in any system where it is desired to measure the distance between an inductive coil and a metal object, whether that object be ferrous or non-ferrous. The invention finds specific application in detecting the level of a molten aluminum bath in continuous casting molds.

An inductive non-contact distance measurement system for liquid metal bath levels is desired, for example, in Yamada et al U.S. Pat. No. 4,030,027, issued Jun. 14, 1977. In that patent, an inductive coil is employed in the feedback circuit of an operational amplifier having two input terminals, one of which is connected to an oscillator and the other of which is connected to the aforesaid feedback circuit. The amplified differential output signal from the amplifier, comprising the difference between the oscillatory signal applied to the differential amplifier and the signal applied to the differential amplifier which varies as a function of the impedance of the detecting coil corresponding to the distance between the detecting coil and the metallic body, are a measure of the distance between the two. At least one of the parameters of open-loop gain of the differential amplifier and the amount of feedback in the feedback circuit are predetermined so as to linearize at least for a predetermined measuring range the output characteristics of the differential amplifier resulting from the variation of the detecting coil impedance caused by the variation of the distance.

Other systems of this type have attemped to provide a linearizing change in the detector circuit for changes in the permeance of the detector coil with the use of bridges, phase-angle correction circuits, and the like. These earlier circuits incorporated the linearizing correction upstream of the first operational amplifier or in the feedback path, exemplified by the aforesaid U.S. Pat. No. 4,030,027.

SUMMARY OF THE INVENTION

In accordance with the present invention, a new and improved non-contact distance measuring system is provided for monitoring the distances between a detecting coil and a metallic object with very high accuracy over either a very short or extended distance, as high as 10 inches. The invention incorporates means for compensating for temperature and other non-linear effects, including other inductive fields, environmental changes, and the like. Other provisions for eliminating non-linear effects include a coolant system for the sensor, a controlled environmental box for the signal processor and electronic compensation circuitry.

The non-contact detecting system of the invention is designed to monitor with very high accuracy the distance between an inductive sensor and a metallic object at temperatures up to 3000° F., enabling the system to be used to detect the level of a molten metal bath.

Specifically, there is provided apparatus for measuring the distance between a detecting coil and a metallic object comprising an oscillator, an amplifier, an L-C circuit preferably including a detecting coil and a capacitor in series connecting the negative input of the amplifier to the common ground input of the amplifier, whereby the amplitude of the signal appearing at the output of the amplifier will vary as a function of the distance between the detecting coil and an adjacent metallic object. The output of the amplifier, in turn, is connected to means for indicating the amplitude of the output signal and, hence, the distance between the detecting coil and a metallic object.

The above and other objects and features of the invention will become apparent from the following detailed description taken in connection with the accompanying drawings which form a part of this specification, and in which:

FIG. 4 is a plot of distance versus output voltage showing the effect of utilizing an input oscillatory voltage source having a frequency which is different than the resonant frequency of the L-C combination of the sensor coil and a capacitor connected to the input of an operational amplifier.

Figure 1:
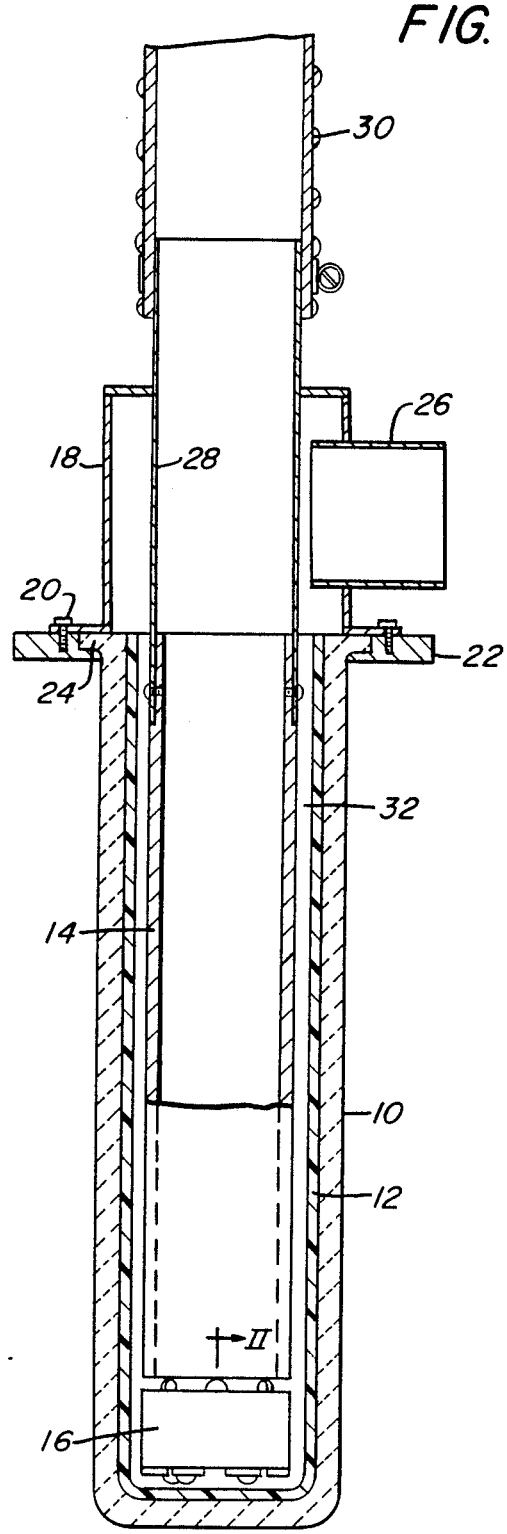
FIG. 1 is a cross-sectional view, in elevation, showing a typical sensor coil assembly which may be used with the invention.

With reference now to the drawings, and particularly to FIG. 1, the sensor coil assembly shown is particularly adapted for use in measuring the liquid level of molten aluminum in the molds of a continuous casting machine. It includes an outer sensor shell 10 formed of refractory material such as fused silica. Typically, it will have an outside diameter of 5 inches, an inside diameter of 4 inches, and a length of about 18 inches. Lining the inner periphery of the shell 10 is an insulating sleeve 12. Carried within the sleeve 12 is a teflon or the like cylindrical coil support 14 having a slotted lower extremity which carries the coil 16 itself.

Covering the upper end of the sensor shell 10 is a sensor cover assembly comprising an outer cup-shaped housing 18 secured by means of screws 20 to a sensor flange 22 which also carries a flange 24 extending radially outwardly from the upper end of the sensor shell 10. The flange 22, in turn, may be connected to any suitable support device. Extending through the side wall of the housing 18 is a pipe 26; and secured to the upper end of the coil support 14 is a metallic extension 28 which extends through the interior of the housing 18 and is connected at its upper end by means of clamp 29 to a corrugated, flexible hose 30. In this manner, air can enter hose 30 and flow downwardly through extension 28 and the coil 16, thence upwardly through an annular passageway 32 between insulating sleeve 12 and the coil support 14 to housing 18 and exit pipe 26. Of course, the direction of airflow can be reversed if desired, the purpose of the air being to minimize temperature variations of the coil 16.

Figure 2:
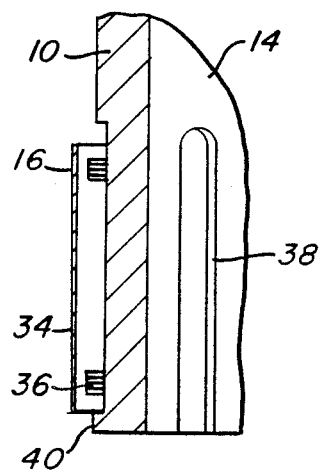
FIG. 2 is a cross-sectional view of the sensor coil itself taken substantially along line II—II of FIG. 1.

The details of the coil itself are shown in FIG. 2. It comprises an outer cover 34 which encases two helical layers 36 of wire. As was mentioned above, the lower end of the coil support 14 is slotted, one of the slots being shown in FIG. 2 and identified by the reference numeral 38. The lower end of the support 14 is provided with an annular flange 40, the coil being wound directly on the fingers formed by the slots 38.

Figure 3:
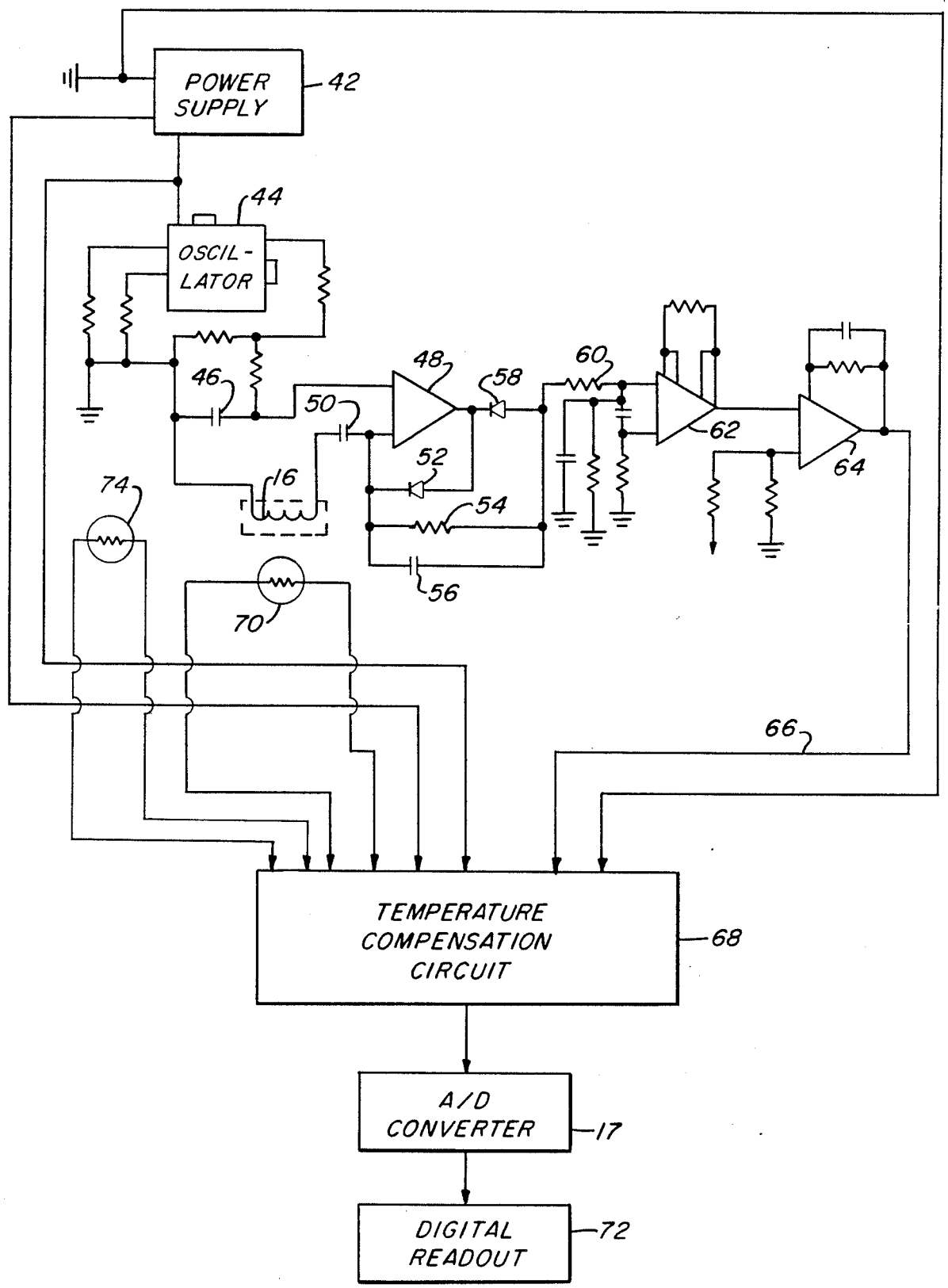
FIG. 3 is a schematic circuit diagram of one embodiment of the invention.

One typical circuit employing the principles of the invention is shown in FIG. 3. It comprises a power supply 42 connected to a oscillator 44, a portion of the output of the oscillator appearing across capacitor 46. One terminal of capacitor 46 is connected to the positive input terminal of a first operational amplifier 48; while the other terminal of capacitor 46 is connected to ground. The sensor coil 16 and capacitor 50 are connected to the negative input terminal of amplifier 48. It will be readily apparent that the capacitor 50 and coil 16 form a series L-C resonant circuit. Three feedback paths are connected between the output of amplifier 48 and its negative terminal to provide a precision half-wave rectifier, one feedback path including a diode 52, a second including a resistor 54 and a third including a capacitor 56. Signals of only one polarity will pass through diode 52 back to the negative terminal of amplifier 48; while signals of the opposite polarity will pass through diode 58, resistor 54 and capacitor 56 back to the negative input terminal.

The output signals from amplifier 48 which pass through diode 58 are applied through resistor 60 to a second operational amplifier 62 and thence to a third operational amplifier 64, the purpose of these amplifiers being for amplification only. The output signal from amplifier 64, comprising a signal which varies as a function of the distance between the bottom of the coil 16 and the level of a molten bath beneath it, appears on lead 66 and is applied to a temperature compensation circuit 68. Also connected to the temperature compensation circuit 68 is the power supply 42 as well as a thermistor 70 embedded in the coils of sensor coil 16. Finally, a thermistor 74 is connected to circuit 68 and measures the coil temperature at a point external to the sensor assembly.

The satisfactory operation of the non-contact level system of the invention depends upon the positive power supply voltage magnitude, the negative power supply voltage magnitude, the temperature of the signal processor electronics, the temperature of the coil itself, the wire temperature of the sensor coil external to the sensor assembly and the sensor coil voltage differential which is proportional to the output signal appearing on lead 66. In order to correct for temperature variations, the temperature compensation circuit must alter the output signal on lead 66 in accordance with the following equation:

$$V_{COMP}=(K_1V+)+(K_2V-)+K_3V_d+K_4V_{temp}+K_5V_0+K_6+K_7V_{WR}$$

where:

$V_{COMP}$ is the compensated output signal from circuit 68;

$V+$ is the magnitude of the positive power supply voltage;

$V-$ is the negative power supply voltage magnitude;

$V_d$ is the temperature of the signal processor electronics;

$V_{temp}$ is the temperature of the coil 16 as measured by thermistor 70;

$V_0$ is the sensor coil voltage differential;

$V_{WR}$ is the temperature of the coil wire external to the sensor assembly as measured by element 74; and $K_1$, $K_2$, $K_3$, $K_4$, $K_5$, $K_6$ and $K_7$ are constants.

$V_d$ can be obtained, for example, from a thermistor or other electrical temperature measuring device disposed within the housing for circuit 68. $V_{COMP}$ appears at the output of the temperature compensation circuit 68 and can be applied, for example, to an analog-to-digital converter 17 connected to a digital readout 72 which indicates the distance between the coil and a molten metal bath, for example, in inches.

It is important to select a resonant frequency of the L-C circuit comprised of sensor 16 and capacitor 50 which is different than the output frequency of the oscillator 44 in order to obtain a linear output over a relatively wide range of distance. This is illustrated, for example, in FIG. 4 for an L-C circuit (i.e., elements 16 and 50) having a resonant frequency of 18,324 Hertz. When the output frequency of the oscillator 44 is exactly at the resonant frequency of 18,324 Hertz, the output voltage-distance curve is represented by curve 74 in FIG. 4. Note that while a larger voltage differential, on the order of 8.5 volts, is obtained over a measurement range of about 1 inch (½ to 1.5 inches), the range itself is relatively small. Operating the oscillator 44 at an off-resonant frequency of 18,229 Hertz produces curve 76 in FIG. 4. Note that curve 76 is linear over a range of 1¾ inches (¾ inch to 2½ inches), the output signal change over this range being 5.5 volts. Further departures from the resonant frequency do not materially increase range as illustrated by curves 78, 80 and 82. Preferably, the off-resonant frequency variation should be 0.02% to 0.10% of the resonant frequency and preferably 0.04% to 0.08%.

Although the invention has been shown in connection with a certain specific embodiment, it will be readily apparent to those skilled in the art that various changes in form and arrangement of parts may be made to suit requirements without departing from the spirit and scope of the invention. In this respect, the linear range of measurement can be varied, up to a maximum of about 10 inches, by varying circuit parameters. Also, it is possible to employ a parallel L-C resonant circuit rather than the series circuit shown herein. Furthermore, two resonant circuits and/or transducer coils can feed one independent operational amplifier or two operational amplifiers with the output signal being proportional to the difference of the resonant circuits. The thermistor shown herein, for example, can be replaced by a thermocouple, RTD wire or the like which provides a temperature signal proportional to the coil temperature and/or the coolant temperature.

We claim as our invention:

1. Apparatus for measuring the distance between a detecting coil and a metallic object comprising:

an oscillator, an amplifier having an input, an L-C circuit including a detecting coil and a capacitor in series connecting the output of said oscillator to the input of said amplifier whereby the amplitude of the signal appearing at the output of said amplifier will vary as a function of the distance between said detecting coil and an adjacent metallic object, the frequency of said oscillator being offset with respect to the resonant frequency of said L-C circuit whereby the output of said amplifier is essentially linear, temperature-compensating means connected to the output of said amplifier for altering said output to correct for fluctuations in power supply voltages and electronic component operating characteristics due to temperature variations thereby producing a temperature-compensated signal; and means for indicating the amplitude of said temperature-compensated signal, and, hence the distance between said detecting coil and an adjacent metallic object.

2. The apparatus of claim 1 wherein said metallic object comprises a molten metallic bath.

3. The apparatus of claim 1 wherein said amplifier comprises an operational amplifier having positive and negative input terminals, one output terminal of said oscillator being connected to one input terminal of said operational amplifier and the other output terminal of said oscillator being connected through said L-C circuit to the other input terminal of said operation amplifier.

4. The apparatus of claim 3 including feedback networks connecting the ouput terminal of said operational amplifier to said other input terminal.

5. The apparatus of claim 4 wherein said feedback networks are three in number, one of which comprises a diode, the other of which comprises a resistor and the third of which comprises a capacitor.

6. The apparatus of claim 1 wherein the output frequency of said oscillator is offset with respect to the resonant frequency of said L-C circuit by approximately 0.02% to 0.10%.

7. The apparatus of claim 1 wherein said temperature-compensating means functions to produce a compensated output signal corresponding to the equation:

$$V_{COMP} = (K_1 V+) + (K_2 V-) + K_3 V_d + K_4 V_{temp} + K_5 V_0 + K_6 + K_7 + V_{WR}$$

where:
  $V_{COMP}$ is the compensated outkput signal;
  $V+$ is the magnitude of the positive power supply voltage;
  $V-$ is the negative power supply voltage magnitude;
  $V_d$ is the temperature of the signal processor electronics;
  $V_{temp}$ is the temperature of the coil;
  $V_0$ is the sensor coil voltage differential;
  $V_{WR}$ is the temperature of the coil wire external to the sensorl assembly; and
  $K_1$, $K_2$, $K_3$, $K_4$, $K_5$, $K_6$ and $K_7$ are constants.

* * * * *